No. 712,174.  
J. F. BEGOLE.  
SYNCHRONISM INDICATOR.  
(Application filed June 9, 1902.)  
Patented Oct. 28, 1902.

(No Model.)  
2 Sheets—Sheet 2.

Witnesses  
W. A. Alexander  
L. B. Beach

Inventor  
Joshua F. Begole  
By Attorneys  
Fowler & Bryson

UNITED STATES PATENT OFFICE.

JOSHUA F. BEGOLE, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SYNCHRONISM-INDICATOR.

SPECIFICATION forming part of Letters Patent No. 712,174, dated October 28, 1902.

Application filed June 9, 1902. Serial No. 110,773. (No model.)

*To all whom it may concern:*

Be it known that I, JOSHUA F. BEGOLE, a citizen of the United States, residing at the city of St. Louis, in the State of Missouri, have invented a certain new and useful Synchronism-Indicator, of which the following is such a full, clear, and exact description as will enable any one skilled in the art to which it appertains to make and use the same, reference being had to the accompanying drawings, forming part of this specification.

My invention relates more particularly to new and useful apparatus for ascertaining the moment at which two or more sources of alternating current are acting in synchronism, and has for its object to provide, by means of a new combination of well-known instruments, a synchronism-indicator suitable for central-station use which will be simple in construction and in its connections and which will readily indicate to the switchboard attendant the proper time at which to throw additional units into connection with the system without disturbing the normal working conditions of the line.

Figure 1:
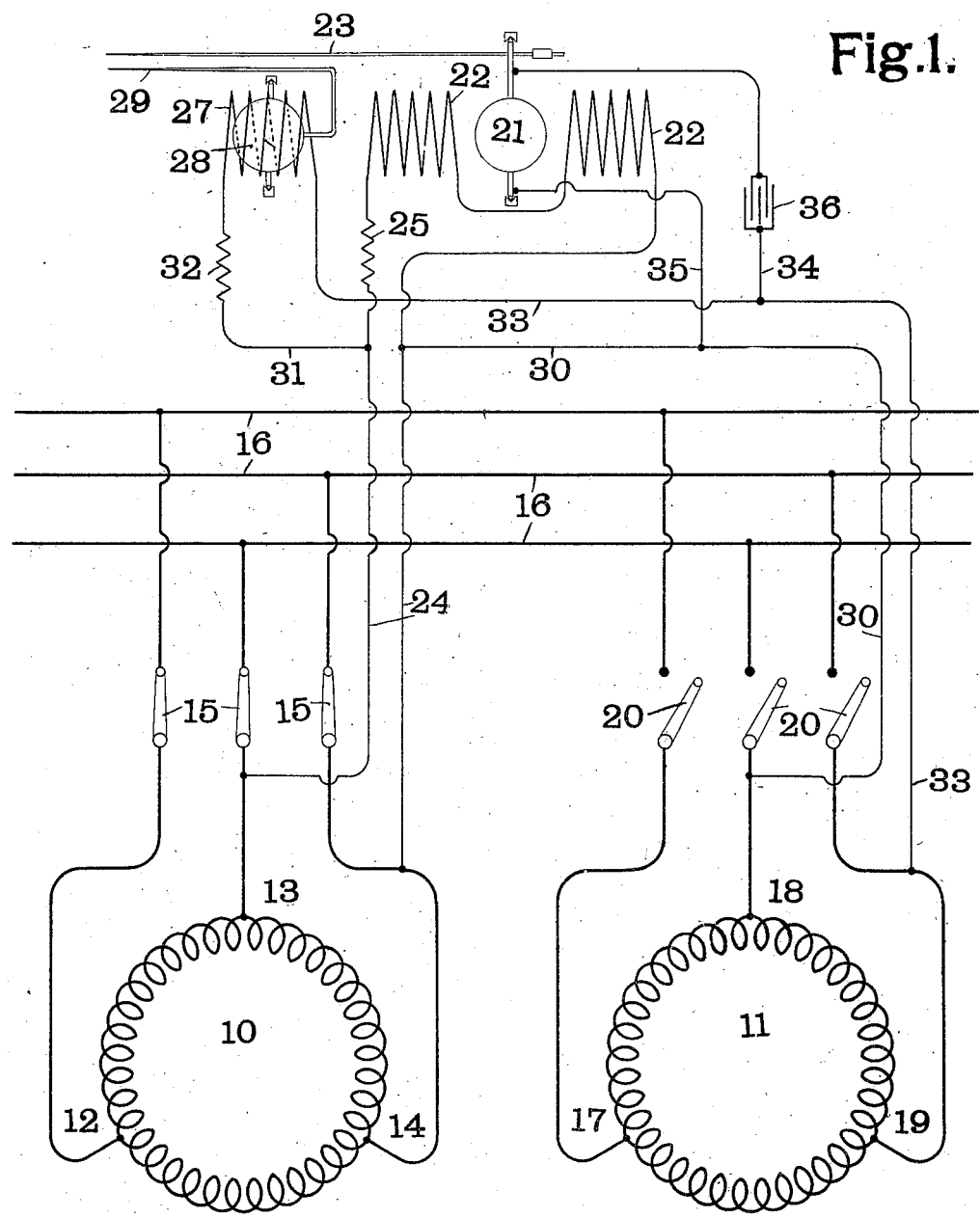
Figure 2:
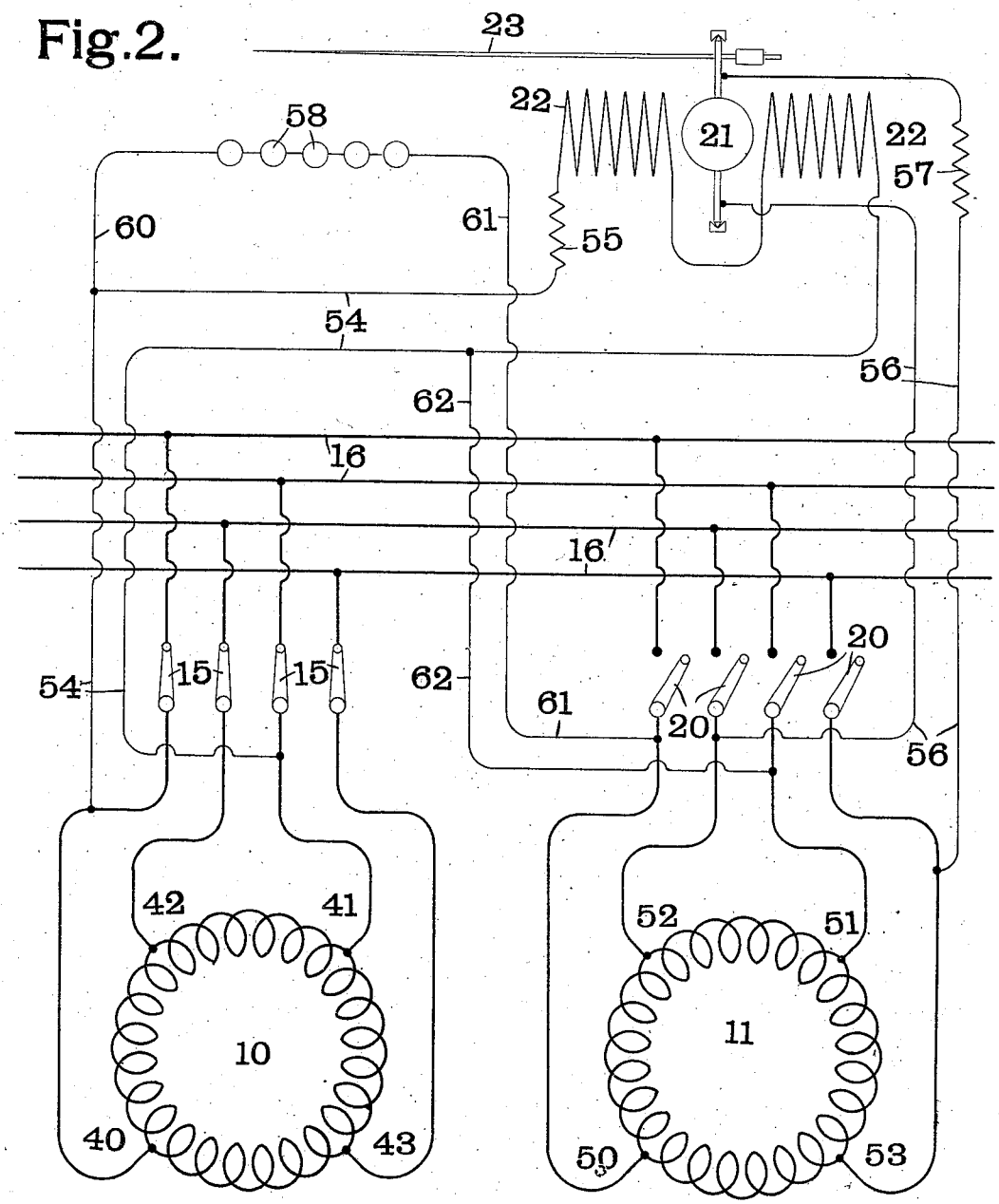

In the drawings forming part of this specification and which show embodiments of my invention, Figure 1 shows in diagram my invention in connection with a three-phase system, and Fig. 2 shows modifications of my invention applied to a two-phase system.

Like marks of reference refer to similar parts in the different views.

Referring first to Fig. 1, 10 and 11 indicate dynamo-electric machines generating three-phase alternating current. The three phases 12, 13, and 14 of the generator 10 are connected through switches 15 to the bus-bars 16. The three phases 17, 18, and 19 of the generator 11 may also be connected by means of switches 20 with the bus-bars 16. 21 indicates the movable coil, and 22 the stationary field-coils, of a phase-indicator of any suitable and usual construction. A pointer 23 serves to indicate the movement of the movable coil 21. The field-coils 22 of the phase-indicator are connected in series by means of a circuit 24 across the phase 13 14 of the generator 10, and an ohmic resistance 25 is included in the circuit 24 in series with the coils 22 to protect the instrument. 27 represents the coil of a voltmeter the movable iron armature of which carries a pointer 29 to indicate its position. The field-coil 27 of the voltmeter is adapted to be energized from the phases 13 14 and 18 19 of the generators 10 and 11, respectively. This is accomplished, as shown in Fig. 1, by connecting said field-coil 27 in series with said phases 13 14 and 18 19 of the generators 10 and 11. This series connection may be traced from the phase 18, through the wire 30 and one side of the circuit 24 to the phase-terminal 14, thence through the winding of the generator 10 to the phase-terminal 13, thence through the remaining side of the circuit 24 through the wire 31 and ohmic resistance 32 to one end of the field-coil 27, whence the circuit leads by means of the wire 33 back to the generator 11 at the terminal 19. The movable coil 21 of the phase-indicator is connected across the phase 18 19 of the generator 11. The phase 18 19 corresponds in position to the phase 13 14 of the generator 10, across which the field-coil of the phase-indicator is connected as above. This connection of the movable coil 21 across the phase 18 19 is made by means of the wires 34 and 35, connected at one end to the wires 30 and 33 and at the other end to the pivots upon which the said movable coil 21 is adapted to rotate. In the wire 34 is connected an impedance in the form of a condenser 36 for the purpose of displacing the phase of the current in the movable coil 21, as hereinafter described.

Fig. 2 shows my synchronism-indicating mechanism connected for use in a two-phase alternating-current system. The phases 40 41, 42 43, and 50 51, 52 53 of the generators 10 and 11 may be connected through switches 15 and 20 with the bus-bars 16, as before described in connection with Fig. 1. In Fig. 2 also, as in Fig. 1, 21 represents the movable coil, 22 the field-coils, and 23 the indicating-needle, of the phase-indicator. The field-coils 22 of the phase-indicator are connected in series across the phase 40 41 of the generator 10 by means of the circuit 54, a resistance 55 being connected in series in the circuit 54 to protect the instrument. The movable coil 21 is connected across the opposite phase 52 53 of the generator 11 by means of the circuit 56, a resistance 57 being connected in series in the circuit 56 to protect the movable coil. A voltage-indicating mechanism is supplied by a number of incandescent lamps 58, connected in series across the corresponding phases 42 43, 52 53 of the two generators 10 and 11. This series connection is so made that the voltages of the two generators 10 and 11 instead of working together, as is the case when the voltage-indicator is connected with the generators as shown in Fig. 1, will be opposed to each other, or, in other words, will assume the condition commonly known as "bucking." This series connection may be traced from the terminal 40 through one side of the circuit 54 to the wire 60, thence through the lamps 58 and wire 61 to the terminal 50, thence through the winding of the generator 11 to the terminal 51, thence through the wire 62 back to the remaining side of the circuit 54, through which it passes to the terminal 41, and thence through the winding of the generator 10 back to the terminal 40.

In the operation of my invention, and referring first to Fig. 1, let it be supposed that the generator 10 is connected with the bus-bars 16 and engaged in supplying current thereto and that it is desired to cut in the generator 11 when said generator 11 is in synchronism with the generator 10. The field-coils 22 and the movable coil 21 of the phase-indicator being connected across corresponding phases of the two generators 10 and 11 and the impedance 36 being made of a value sufficient to place the current flowing through the coil 21 in quadrature with the current flowing in the field-coils 22, it will be observed that as the generator 11 approaches synchronism with the generator 10 the pointer of the phase-indicator will begin to oscillate rapidly back and forth. The oscillation of this pointer 23 will gradually become less rapid, and finally the pointer will come to rest when the two generators are either one hundred and eighty degrees apart or in exact synchronism with each other. The voltmeter connected in series across the two machines will indicate which of these two positions the generators occupy with respect to each other—that is, whether or not they are in exact synchronism, or one hundred and eighty degrees apart. The voltmeter being connected across the two generators in such a way that the electromotive forces of the generators operate in conjunction with each other, the two machines will be in exact synchronism when the pointer of the voltmeter is in its position of maximum displacement, and the voltmeter-pointer will stand at zero when the machines are one hundred and eighty degrees apart. The proper time, therefore, to cut in the generator 11 will be indicated by the fact that the pointer 23 after slowly oscillating has come to rest and the pointer 29 of the voltmeter occupies its position of maximum displacement. When the pointers are in this position, the generator 11 is connected, by means of the switches 20, with the bus-bars 16.

Referring now to Fig. 2, the operation of my invention is substantially the same as that described in connection with Fig. 1. In the apparatus shown in Fig. 2 quadrature between the currents energizing the field-coils and the movable coil of the phase-indicator is obtained by connecting the movable coil 21 of the phase-indicator across that phase of the generator 11 which differs by ninety degrees from that phase of the generator 10 across which the field-coils 22 of the phase-indicator are connected. This does away with the necessity of employing an impedance, as indicated at 36 in Fig. 1. In Fig. 2 means for determining whether the two generators are in exact synchronism, or one hundred and eighty degrees apart, is furnished by the incandescent lamps 58 instead of an ordinary voltmeter, as described in connection with Fig. 1. These lamps are so connected across corresponding phases of the generators 10 and 11 that the electromotive forces of the generators will act in opposition to one another. In other words, the lamps are connected for "synchronizing dark." The proper time, therefore, for throwing the generator 11 into connection with the bus-bars 16 is when the pointer 23 of the phase-indicator after slowly oscillating has come to rest and the lamps 58 have ceased to burn.

I am aware that a considerable number of changes may be made in the specific embodiments of my invention herein shown and described, and this is particularly true of the arrangement of the circuits whereby the voltage-indicator and phase-indicator are energized from the generators or other sources of alternating current. Such changes are within the contemplation of my invention and are intended to be covered by the following claims.

Having fully described my invention, what I claim as new, and desire to secure by Letters Patent of the United States, is—

1. In a synchronism-indicator, two sources of alternating current, a voltage-indicator energized from said sources, and a phase-indicator comprising two coils one of which is movable relative to the other, one of said coils being supplied with current from one of said sources and the other of said coils being supplied with current from the other of said sources.

2. In a synchronism-indicator, two sources of alternating current, a voltage-indicator in series relation with said sources, and a phase-indicator comprising two coils one of which is movable relative to the other, one of said coils being supplied with current from one of said sources, and the other of said coils being supplied with current from the other of said sources.

3. In a synchronism-indicator, two sources of alternating current, a voltage-indicator energized from said sources, a phase-indicator comprising two coils one of which is movable relative to the other, one of said coils being supplied with current from one of said sources and the other of said coils being supplied with current from the corresponding phase of the other of said sources, and means for displacing the phase of the current in one of said coils.

4. In a synchronism-indicator, two sources of alternating current, a voltage-indicator in series relation with said sources, a phase-indicator comprising two coils one of which is movable relative to the other, one of said coils being supplied with current from one of said sources and the other of said coils being supplied with current from the corresponding phase of the other of said sources, and means for displacing the phase of the current in one of said coils.

5. In a synchronism-indicator, two sources of polyphase alternating current, a voltage-indicator in series relation with corresponding phases of said sources, a phase-indicator comprising two coils one of which is movable relative to the other, one of said coils being supplied with current from one of said phases in series relation with said voltage-indicator and the other of said coils being supplied with current from the other of said phases in series relation with said voltage-indicator, and means for displacing the phase of the current in one of said coils.

In testimony whereof I have hereunto set my hand and affixed my seal in presence of the two subscribing witnesses.

JOSHUA F. BEGOLE. [L. S.]

Witnesses:
J. H. BRYSON,
L. B. BEACH.